Patented Oct. 13, 1953

UNITED STATES PATENT OFFICE 2,655,502

DYESTUFFS OF THE BENZANTHRONE ACRIDINE SERIES

Mario Scalera and Harry E. Westlake, Jr., Somerville, N. J., assignors to American Cyanamid Company, New York, N. Y., a corporation of Maine No Drawing. Application May 21, 1952, Serial No. 289,204

3 Claims. (Cl. 260—274)

This invention relates to new dyestuffs of the benzanthrone acridine series having the following formula

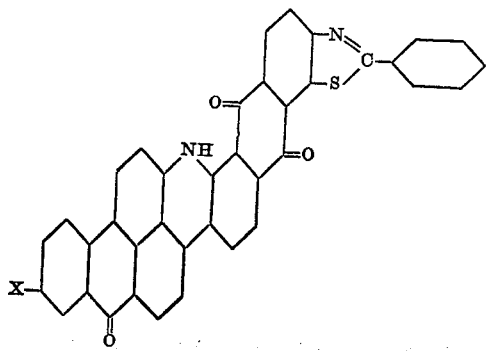

in which X may be hydrogen or

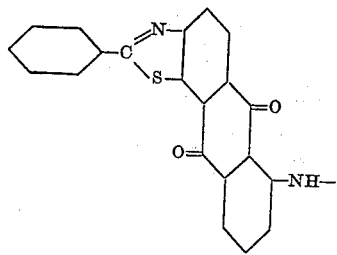

Benzanthrone acridine dyestuffs are known and are green in color. Also phenylthiazoloanthraquinones are known as vat dyestuffs and they are yellow. It would ordinarily be expected that compounds of the formula of those of the present invention would be yellowish green; that is to say, insofar as one can predict colors where a molecule contains two portions that are in themselves vat dyestuffs. Surprisingly, however, the compounds of the present invention are khaki colors of strong shades and excellent properties. It is not known why the two components of the molecule of the dyes of the present invention result in a color which is unexpected, and the present invention is not intended to be limited to any theory of why the unexpectedly large change in color takes place.

The dyestuffs of the present invention are prepared in two steps. First, the corresponding anthrimides are formed which are themselves new chemical compounds and these are then subjected to ring closure to form the finished acridine dye. It should be noted that only the acridine ring closes, although there are two anthrimide linkages, the second of which might produce by ring closure a carbazole. The reason why only the acridine ring forms has not been determined and the invention is not intended to be limited to any theory of why in the case of one of the dyestuffs ring closure takes place with only one of the two anthrimide linkages.

The invention will be described in the following examples, the parts being by weight unless otherwise specified.

EXAMPLE 1

*1-(Bz-1-benzanthranylamino)-5,6-phenyl-thiazoloanthraquinone*

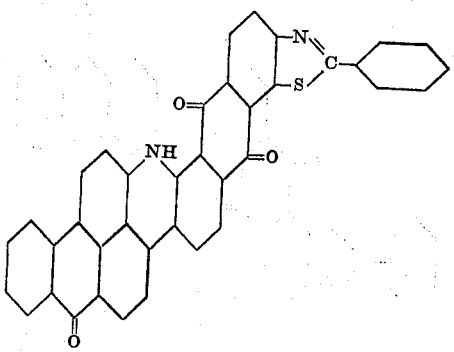

A mixture of 1.7 parts of 1-amino-5,6-phenyl-thiazoloanthraquinone, 1.52 parts monobromobenzanthrone, 0.6 part of anhydrous sodium acetate, 0.15 part of cupric acetate, and 35 parts of nitrobenzene is stirred at 200° C. until the reaction is completed. The mixture is then cooled to 80° C. and 9 parts of solvent naphtha are added. The precipitated product is isolated by filtration and washed with nitrobenzene, solvent naphtha and alcohol. The inorganic salts are then washed out with water and the product, a dark brown crystalline solid, is dried.

EXAMPLE 2

*Acridine from 1-(Bz-1-benzanthronylamino)-5,6-phenylthiazoloanthraquinone*

A mixture of 1.8 parts of the anthrimide prepared in Example 1, 10 parts of ethyl alcohol, and 10 parts of potassium hydroxide is heated at 120° C. until the reaction is complete. The product is then isolated by drowning the reaction mixture in water, aerating, and filtering the precipitated material. The resultant dark gray solid when applied to cellulose fibers by the usual method dyes them a strong khaki shade of excellent fastness.

EXAMPLE 3

Bz-1,6-bis(5,6-phenylthiazoloanthraquinonyl-1-amino)-benzanthrone

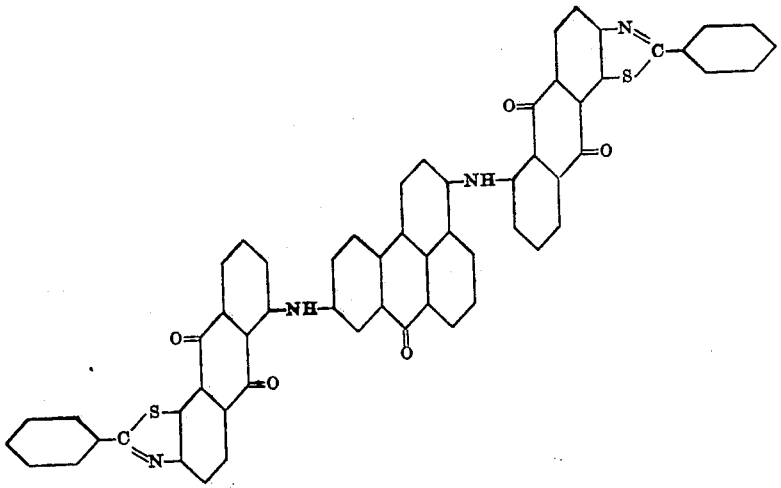

A mixture of 24 parts of nitrobenzene, 2 parts of Bz-1,6-dibromobenzanthrone, 4 parts of 1-amino-5,6-phenylthiazoloanthraquinone, 2 parts of sodium carbonate, 0.27 part of copper, and 0.7 part of iodine is stirred and refluxed until the reaction is complete. The product is isolated by cooling the reaction to 30° C. and filtering, followed by washing the product with nitrobenzene and alcohol. The dark brown crystalline product is dried.

A mixture of 11.1 parts of potassium hydroxide and 22 parts of methanol is heated to 100° C. An additional 24.8 parts potassium hydroxide is added and the mixture is stirred a short time at 150° C. It is then cooled a few degrees and 7 parts of the anthrimide prepared in Example 3 is added. The mixture is heated at reflux until the starting material is no longer detectable. The reaction mixture is then drowned in water and a stream of air is passed through the slurry until all has precipitated. The product is isolated by filtration and washing. It is a dark gray solid which dyes cellulose fibers when applied in the usual manner a strong kahki shade somewhat greener than that obtained from the product of Example 2.

EXAMPLE 4

Acridine from Bz-1,6-bis(5,6-phenylthiazoloan-thraquinonyl-1-amino) benzanthrone

We claim:
1. Compounds of the formula
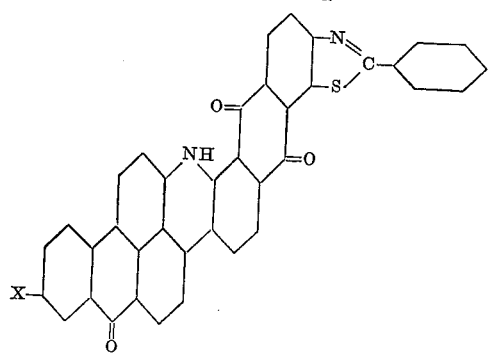
in which X is selected from the group consisting of hydrogen and the grouping
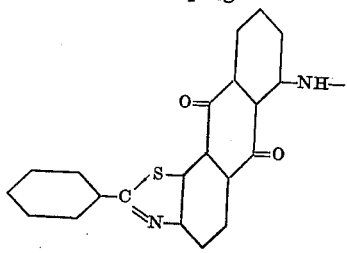
2. The compound of the structure
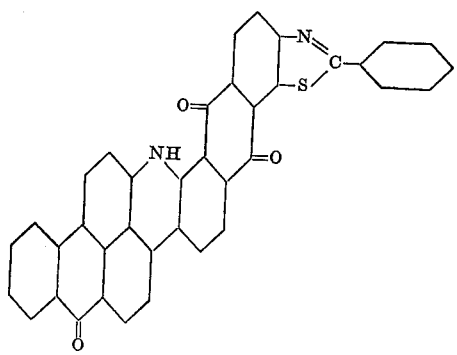
3. The compound of the structure
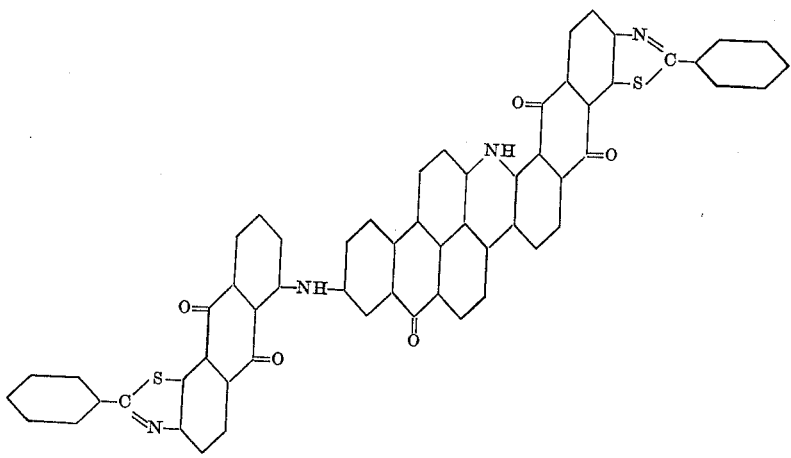
MARIO SCALERA.
HARRY E. WESTLAKE, Jr.
No references cited.